(No Model.)
8 Sheets—Sheet 4.
W. L. CASADAY.
SULKY PLOW.
No. 299,343.   Patented May 27, 1884.
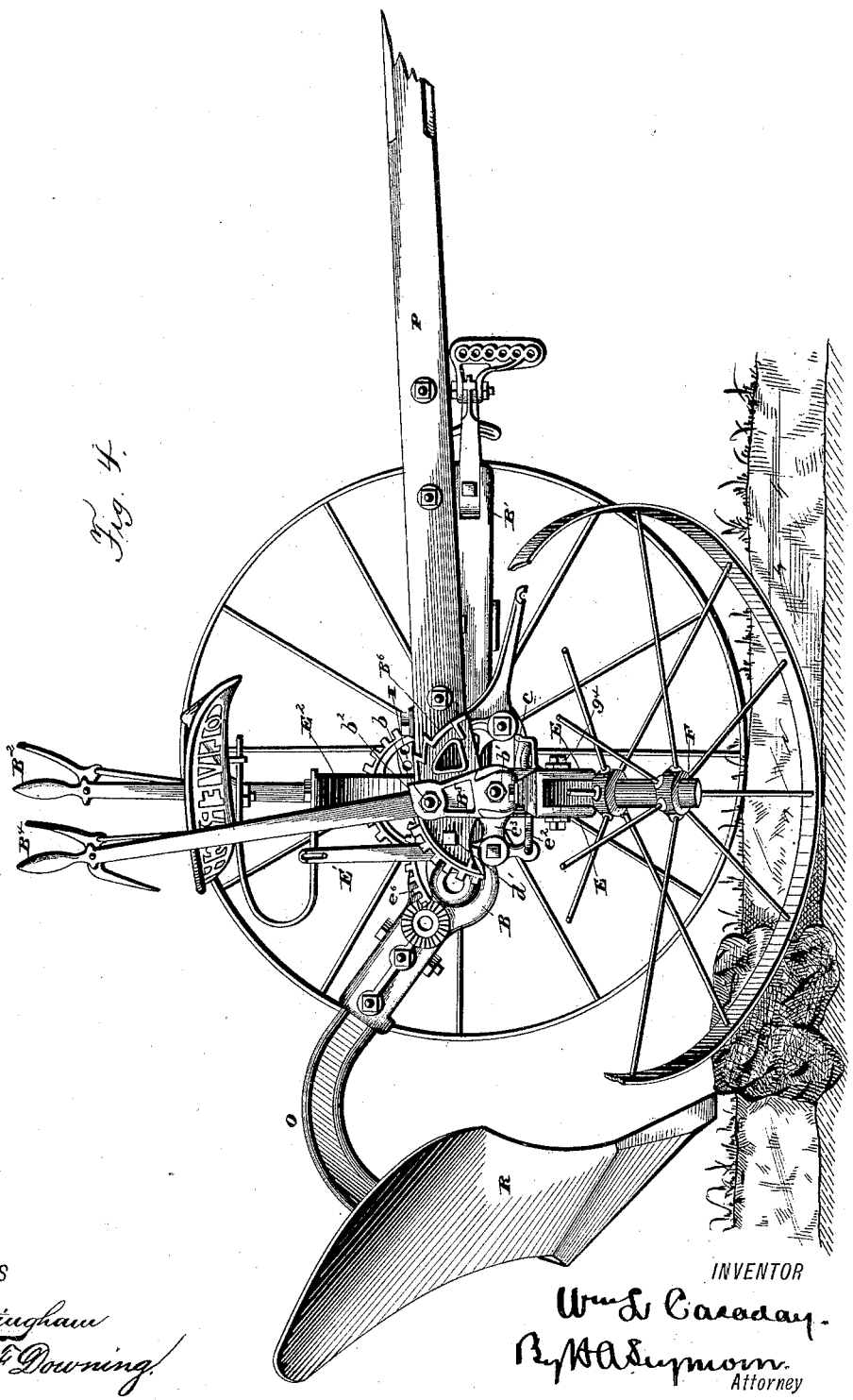
WITNESSES
INVENTOR (No Model.)  8 Sheets—Sheet 5.
W. L. CASADAY.
SULKY PLOW.
No. 299,343. Patented May 27, 1884.
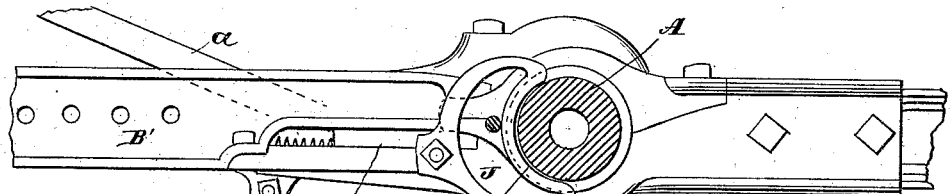
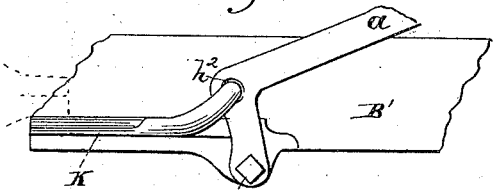
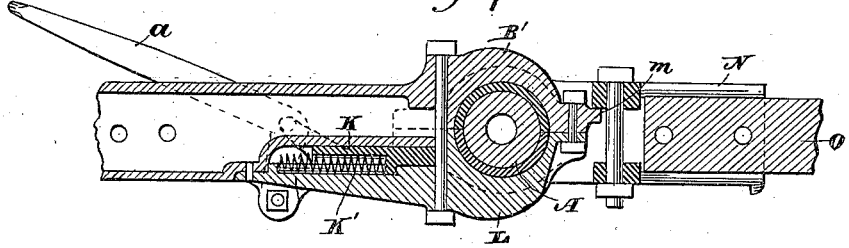
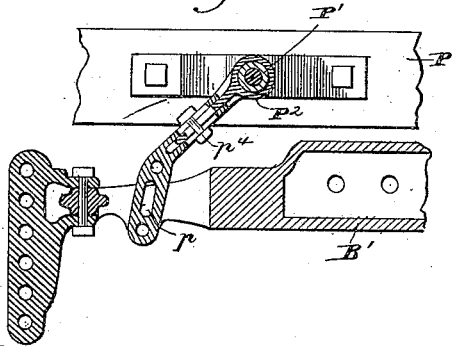
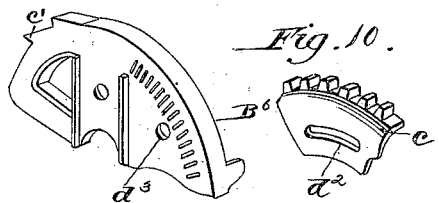
Witnesses:
Frank G. Blanchard
George F. Downing
Inventor:
Wm. L. Casaday
By H. A. Seymour, Attorney.

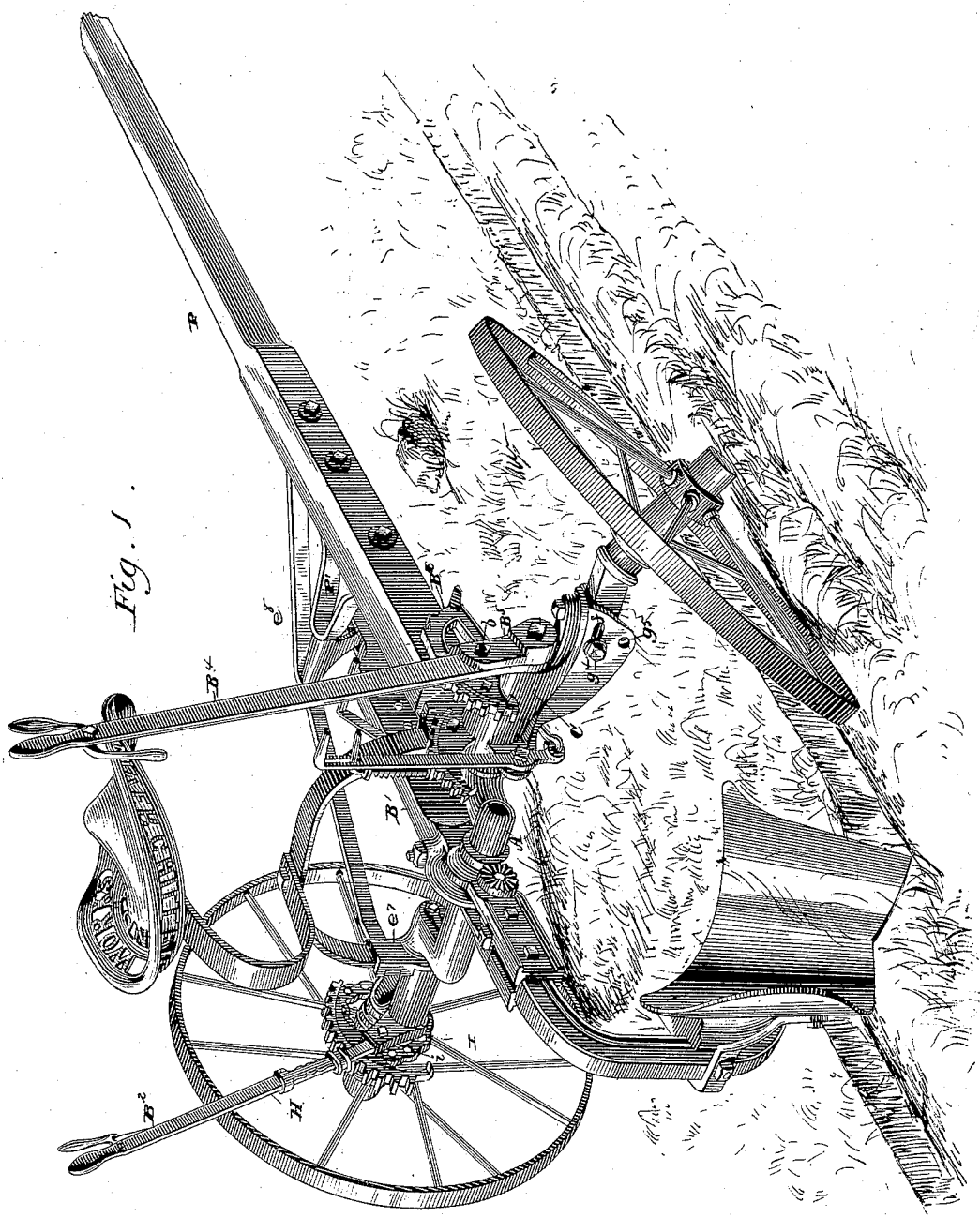

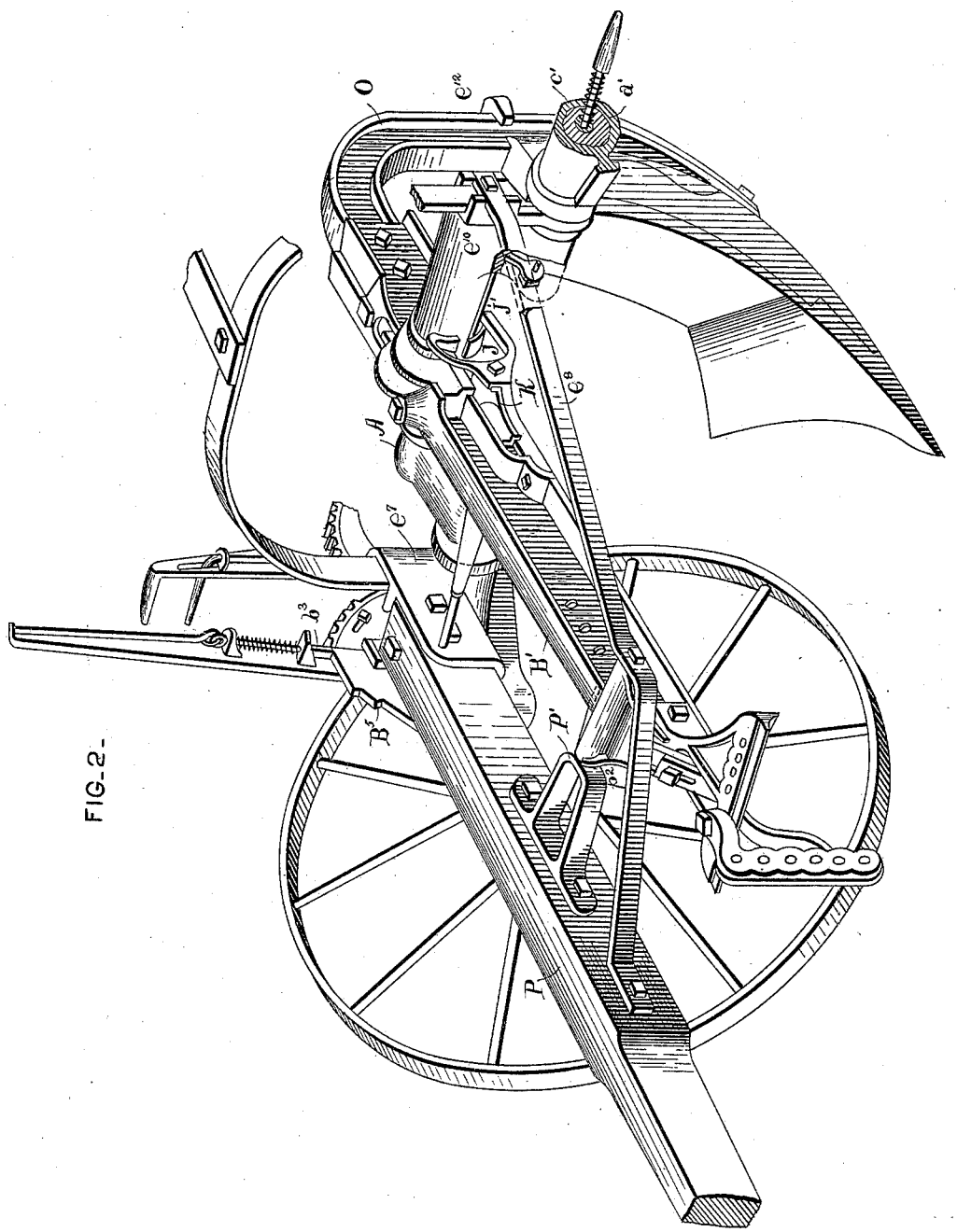

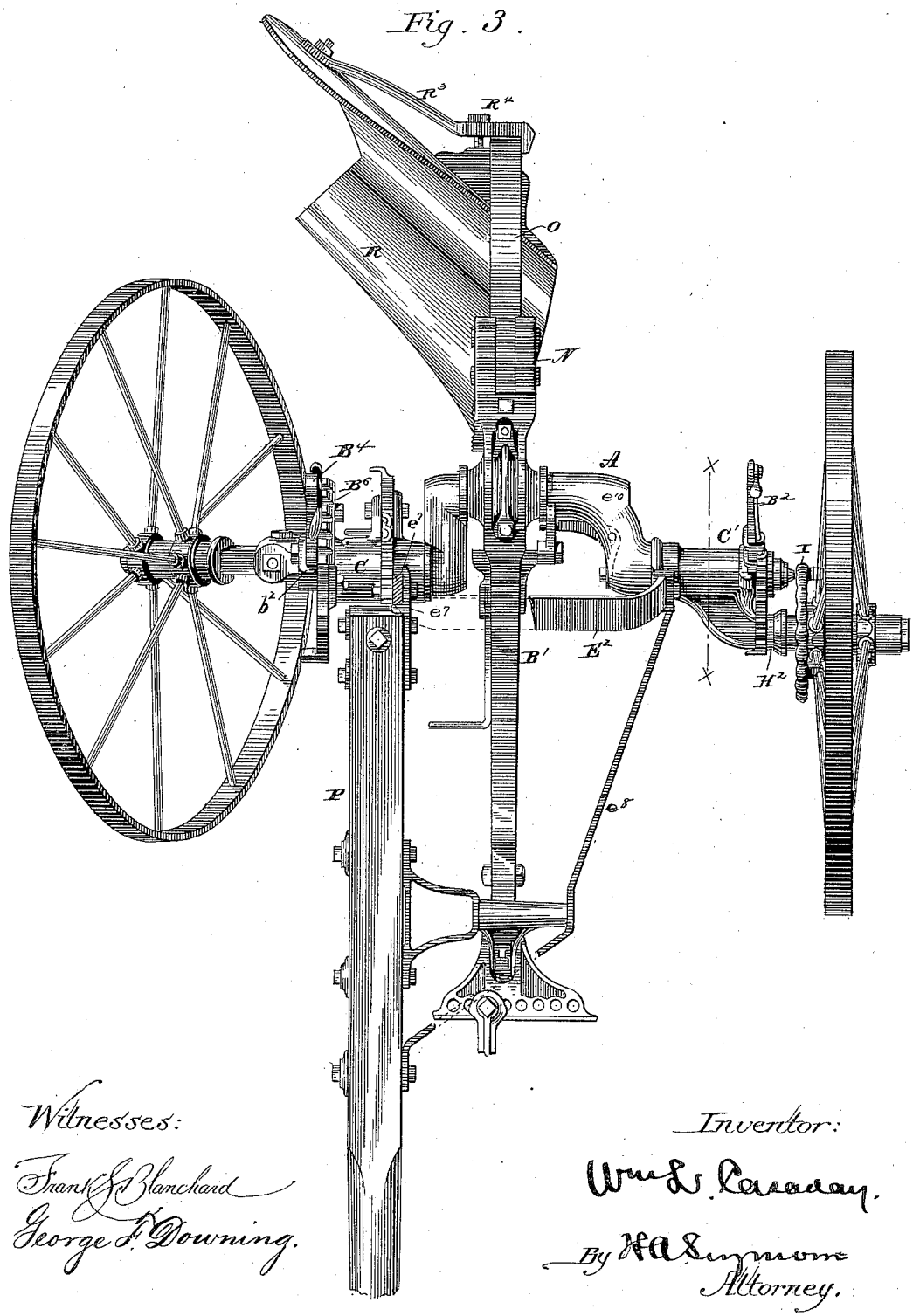

(No Model.) 8 Sheets—Sheet 6.
W. L. CASADAY.
SULKY PLOW.
No. 299,343. Patented May 27, 1884.
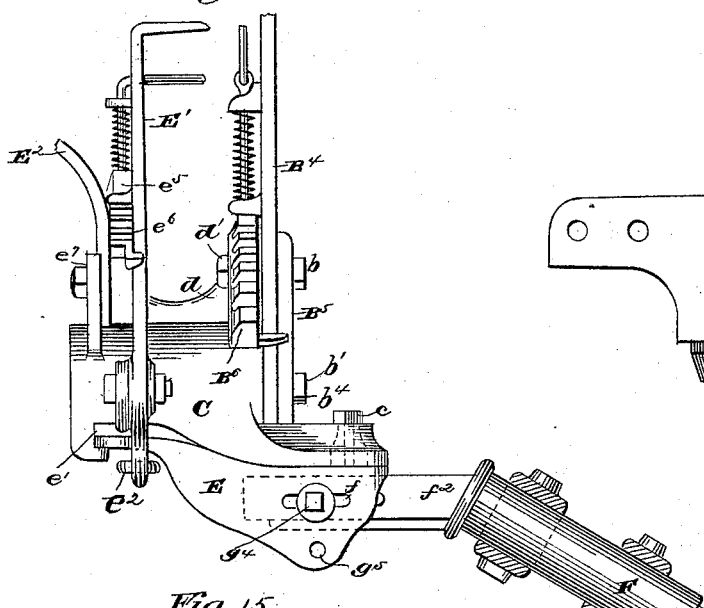
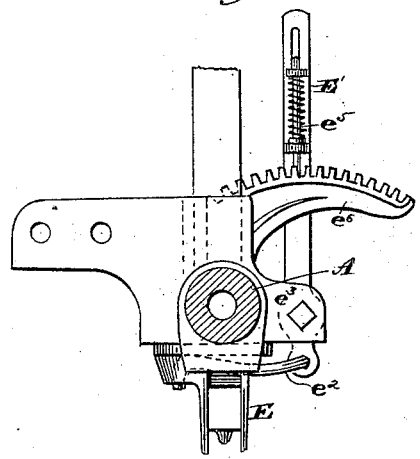
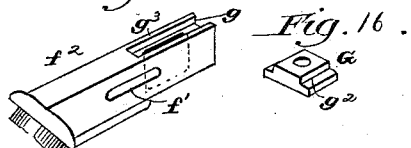
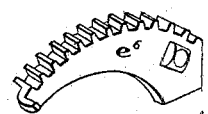
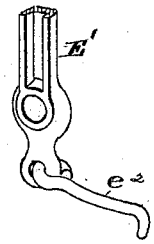
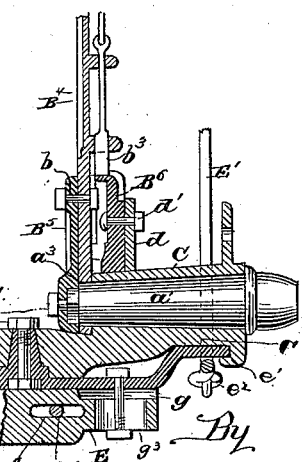
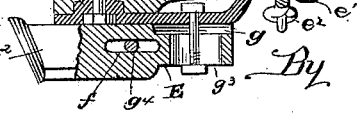
Witnesses:
Frank G. Blanchard
George F. Downing
Inventor:
Wm L. Casaday
By ...... Symmonn
Attorney.

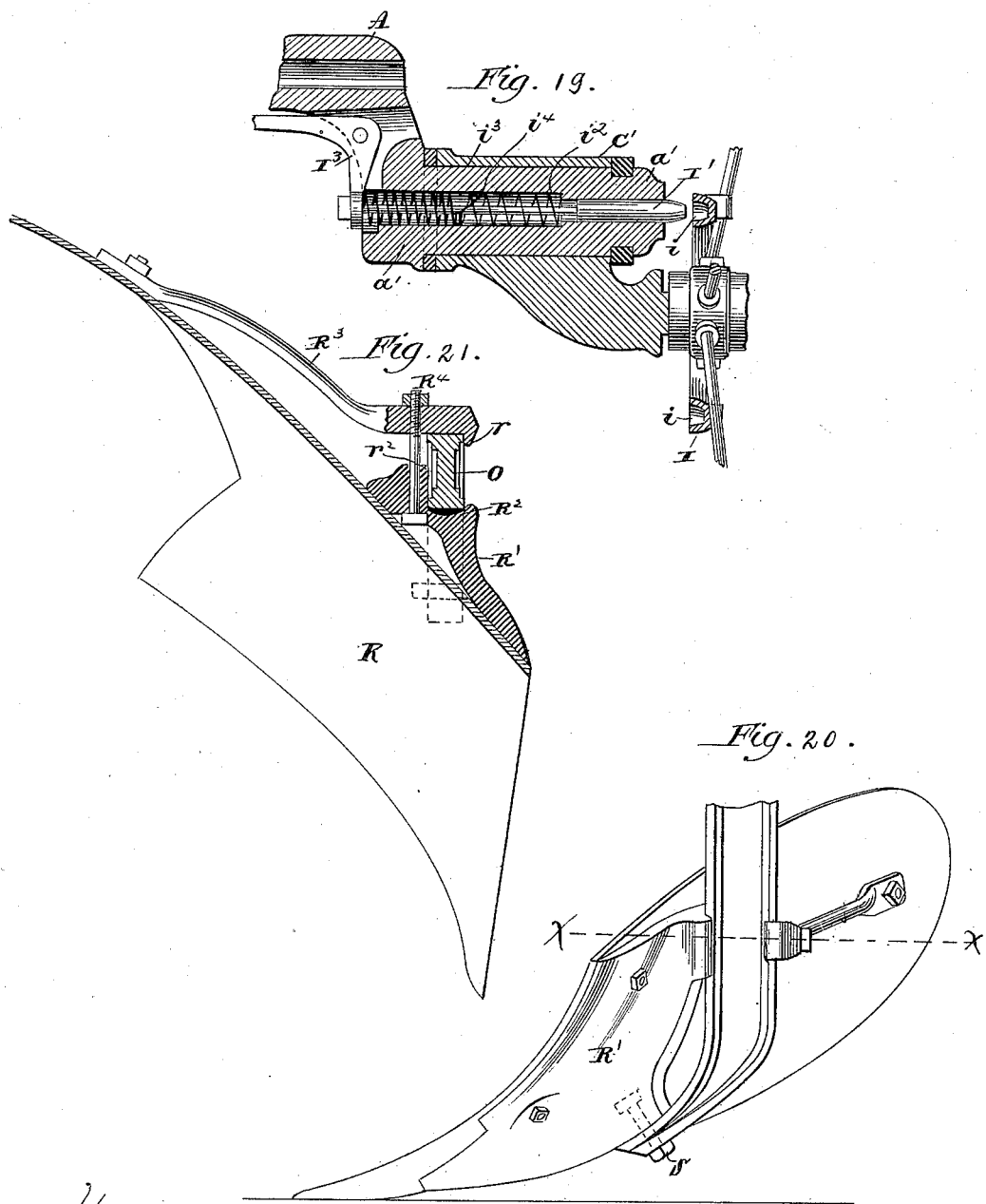

(No Model.) 8 Sheets—Sheet 8.
W. L. CASADAY.
SULKY PLOW.
No. 299,343. Patented May 27, 1884.
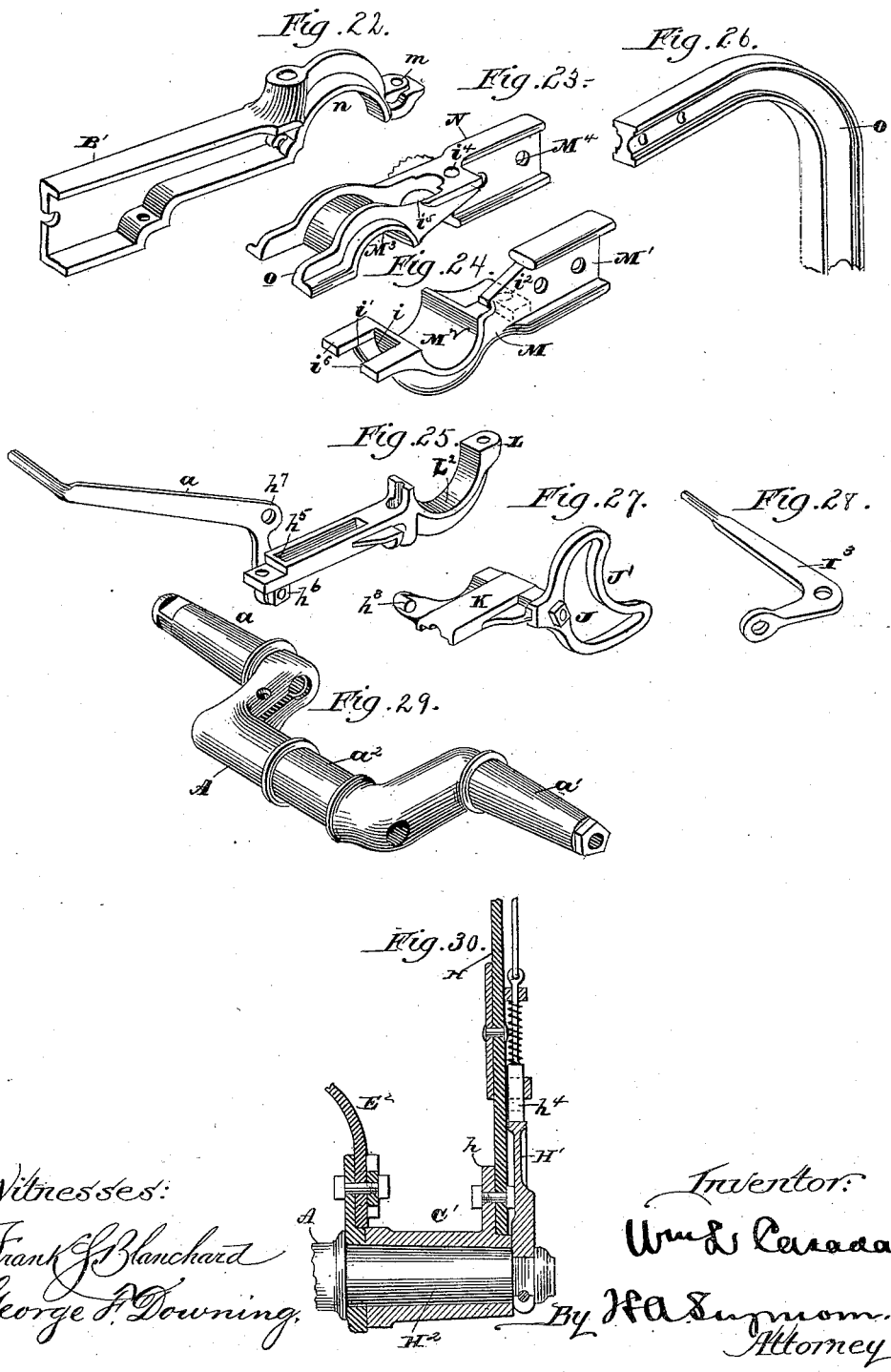
Witnesses:
Frank G. Blanchard
George F. Downing
Inventor:
Wm L Casaday.
By H A Seymour
Attorney

UNITED STATES PATENT OFFICE.

WILLIAM L. CASADAY, OF SOUTH BEND, INDIANA, ASSIGNOR OF ONE-HALF TO THE SOUTH BEND IRON WORKS, OF SAME PLACE.

SULKY-PLOW.

SPECIFICATION forming part of Letters Patent No. 299,343, dated May 27, 1884.

Application filed February 12, 1884. (No model.)

*To all whom it may concern:*

Be it known that I, WILLIAM L. CASADAY, of South Bend, in the county of St. Joseph and State of Indiana, have invented certain new and useful Improvements in Sulky-Plows; and I do hereby declare the following to be a full, clear, and exact description of the invention, such as will enable others skilled in the art to which it appertains to make and use the same.

My invention relates to an improvement in sulky-plows, the object of the same being to provide a strong and compact frame or sulky that will combine simplicity and economy in construction with durability and efficiency in use; and with these ends in view my invention consists in the parts and combinations of parts, as will be hereinafter more fully described, and pointed out in the claims.

In the accompanying drawings, Figure 1 is a view in perspective of my improved machine. Fig. 2 is a similar view taken from the front, the wheel on the landside of the plow being removed. Fig. 3 is a plan view. Fig. 4 is a view in side elevation showing the plow in the act of rising over an obstruction. Fig. 5 is a view in side elevation of a portion of the jointed plow-beam. Fig. 6 is a view taken from the opposite side of the beam, showing the lever $a$ for operating the dog. Fig. 7 is a vertical longitudinal sectional view through the jointed beam. Fig. 8 is a similar view showing the manner of securing the front end of the plow-beam to the draft-tongue. Figs. 9 and 10 show the two-part segment situated on the mold-board side of the plow for holding the crank-axle in any desired position. Fig. 11 is a view in side elevation, showing the sleeve and wheel-spindle on the mold-board side of the machine. Fig. 12 is a horizontal sectional view of the same. Fig. 13 is a view in end elevation showing the inner end of the sleeve. Fig. 14 is a view in perspective of a segment-rack secured to this spindle, by means of which the wheel-spindle on the same side of the machine is held against movement after it has been adjusted. Fig. 15 is a view of the inner end of the spindle. Fig. 16 is a view of the stepped washer, by means of which the inclination of the spindle can be adjusted. Fig. 17 is a view of the pivoted block to which the spindle is adjustably secured. Fig. 18 is a view of the lever and pitman employed in turning the pivoted block shown in Fig. 17. Fig. 19 is a view in vertical longitudinal section of an end of the cranked axle, showing the mechanism for locking the axle to the wheel. Fig. 20 is a view in side elevation showing the manner of securing the plow to the standard. Fig. 21 is a view taken on the line $x\,x$ of Fig. 20. Figs. 22, 23, 24, and 25 are views in perspective of the sections of the beam forming the joint. Fig. 26 is a view of the plow-standard. Fig. 27 is a view of the locking-tongue. Fig. 28 is a perspective view of the bell-crank lever operated by the movement of the locking-tongue. Fig. 29 is a perspective view of the axle, and Fig. 30 is a view in vertical longitudinal section of the spindle C' and the adjacent parts.

A represents the crank, the spindles $a'$ of which are hollow, for a purpose to be hereinafter described. This crank is provided near its center with the bearing $a^2$, which latter is embraced by the joint B of the plow-beam B'. On this crank are located two hand-levers, one, $B^2$, on the land side, and the other, $B^4$, on the furrow side. The latter lever, $B^4$, is provided at its lower end with a circular opening, $a^3$, through which the end of the spindle $a'$ on the same side of the machine projects. The extreme end of this spindle is made angular, as shown at $a^5$, which latter portion projects through the opening $a^3$ in the end of the lever, and rests within an angular socket formed in the lower end of the short plate $B^5$. This plate, which, together with the lever $B^4$, constitutes a single lever, $B^3$, is secured to the long lever $B^4$ by the short bolt $b$ and the long bolt $b'$, and is provided with the inwardly-projecting finger, $b^2$, which latter rests in front of the lever $B^4$. This lever is employed for turning the crank and elevating and lowering the plow, and is provided with a spring-actuated dog, $b^3$, which latter engages the double segment $B^6$, secured to the sleeve C, and holds the lever, and consequently the crank, in the desired position. As before stated, the spindle $a'$ is hollow, and is provided about midway its length with a shoulder, against which the head of the bolt $b'$ abuts. This bolt projects outwardly through the lever $B^4$ and the plate $B^5$, and is provided with a small screw-threaded end, on which the nut $b^4$ is screwed. The spindle $a'$ is embraced by the sleeve C, and the latter is prevented from moving longitudinally by the lever $B^4$, which latter, as before stated, is secured in position by the bolt $b'$. The sleeve C is provided with the two-part sector $B^6$, rigidly secured thereto, with which the dog $b^3$ of the lever $B^4$ engages. Thus it will be seen that by releasing the dog from the sector $B^6$ and moving the lever $B^4$ forwardly, the axle A is turned, which movement elevates the plow. By releasing the spring-actuated dog the latter is free to engage one of the teeth of the sector and rigidly hold the sleeve and axle together, and prevents one from moving independently of the other.

The sector $B^6$, shown in Figs. 10 and 11, is preferably made in two parts, one of the parts, $c$, being provided with ordinary pinion-teeth, and the other part, $c'$, being provided with ratchet-teeth, so set as to allow the lever $B^4$ to move forwardly without the necessity of elevating the dog $b^3$ by hand. This dog $b^3$ ordinarily rests against the front face of the first tooth of the portion $c$ of the sector, and the lever is consequently free to be moved forwardly. If an obstruction is encountered and it should be necessary to elevate the plow to enable the latter to ride over the obstruction, the plow is elevated by the draft of the team, as will be hereinafter described, and the axle A turned. This turning of the axle necessarily moves the lever $B^4$ forwardly, and when the plow has reached its highest possible elevation, and before it could possibly drop if the team should slack up, the dog $b^3$ would drop in front of the ratchet-teeth $c'$ and prevent the plow from settling down. If it is desired to lower the plow, the lever $B^4$ is grasped and the dog $b^3$ withdrawn from the sector, which leaves the plow free to fall. When plowing in stony ground, the plow is liable to jump out of the ground if the dog $b^3$ is left free, and hence it becomes necessary to lock the dog $b^3$ in one of the teeth of the part $c$ of the sector $B^6$. This locking of the dog prevents the axle from turning, and hence the plow cannot leave the ground without lifting the whole frame bodily. In plowing stony ground it is also preferable to disconnect the levers $B^4$ and plate $B^5$ by removing the bolt $b$. This leaves the lever $B^4$ free to be moved rearwardly independent of the plate $B^5$, and the latter is, as before stated, provided with an inwardly-projecting finger, $b^2$, against which the lever $B^4$ abuts. In plowing, especially in some stony land, unless the plow is locked down in the manner before described, it is liable to jump up when it meets with an obstruction. This jumping up of the plow necessarily turns the axle and throws the hand-lever $B^4$ forward with considerable force. If the driver should be leaning over within reach of the lever, he might be injured thereby, and the object in connecting the lever $B^4$ to the spindle $a'$ by the plate $B^5$ is to enable the axle to turn without necessarily turning the long lever. When the parts are thus loosely connected, the cranked axle can be turned by moving the lever $B^4$ forward until it strikes the inwardly-projecting finger, $b^3$, of the short lever or plate. By then continuing the forward thrust of the lever $B^4$, the lever $B^4$ and plate $B^5$ are moved simultaneously and locked by allowing the dog $b^3$ to enter the teeth of the sector. The main portion of the two-part sector is bolted to a lug, $d$, on the sleeve C, and the smaller portion, which is provided with the ordinary pinion-teeth, is securely bolted to the main portion by a single bolt, $d'$, which latter passes through an oblong slot, $d^2$, in the small portion and the hole $d^3$ in the larger portion. The meeting faces of the two parts are serrated to prevent them from slipping, and the smaller portion is provided with a toothed rim, which latter rests on the curved surface of the larger portion of the sector. The depth of the furrow is regulated by the lever $B^4$, or, that is to say, the plow is lowered by the lever until it rests in the same plane with the lower edge of the wheel. It sometimes happens that in soft soil the inclined wheel will sink into the ground an inch or so, and consequently cause the plow to penetrate an inch or more corresponding with the sinking of the wheel. When it is evident from the condition of the soil that the furrow or inclined wheel will sink, the small portion $c$ of the sector $B^6$ is moved forwardly a distance sufficient to compensate for the sinking of the wheel. Thus it will be seen that when the dog $b^3$ engages the front face of the first or other predetermined tooth, the lower edge of the plow will rest above the lower edge of the furrow-wheel a distance equal to the depth the furrow-wheel will sink. If no provision was made for the sinking of the wheel, the furrow would gradually deepen until it would be impossible to move the plow. To illustrate, suppose I make a furrow of six inches and my furrow-wheel is running in this furrow and sinks one inch, as the plow is on a level with the lower edge of the furrow-wheel, it also penetrates through seven inches of soil. When the furrow-wheel reaches this furrow, it will sink one inch, and consequently the next furrow will be eight inches, and so on; but where the plow is elevated above the lower edge of the furrow-wheel a distance equal to the sinking of the furrow, the furrows are all cut the same depth.

To the under side of the sleeve C, and at its outer end, is pivotally secured, by the bolt $e$, the box E, the outer end of which slides in the groove $e'$, formed in the sleeve C. To the rear edge of this box is pivoted the pitman $e^2$, the lower edge of which is pivotally attached to the lower end of the operating-lever $E'$. This lever is pivoted to the rearwardly-projecting lug $e^3$ of the sleeve C, and is provided with the spring-actuated dog $e^5$, adapted to engage the sector $e^6$, which latter, together with one end of the seat-supporting arch $E^2$, are rigidly secured to the upwardly-projecting lug $e^7$ of the sleeve C. The box E is hollow and open on its lower face, and is provided on its opposite sides with the elongated slots $f$, which latter register with the elongated slots $f'$ of the inwardly-extending arm $f^2$ of the wheel-spindle F. By means of these elongated slots in the arm $f^2$ and the box E, the width of the furrow can be increased or diminished, as necessity demands. This arm $f^2$ is also provided with an elongated vertical slot for the passage of a vertical bolt, which latter passes through the box and arm $f^2$ and assists in holding the latter in its place. When the arm $f^2$ of the spindle is in a horizontal position, as shown in Fig. 12, the spindle F is so inclined that the furrow-wheel runs against the land wall and prevents the plow from swerving to the left. It occasionally happens that the resistance of the furrow on the plow causes the furrow-wheel to mount the wall, and consequently elevate the plow above the surface. Again, in prairie or shallow plowing, the resistance is not sufficient to cause the furrow-wheel to run in contact with the wall, and the plow-frame swerves to the right and gradually diminishes the width of the furrow. These objections I overcome by pivoting the block E, to which the wheel-spindle is attached. By means of this pivoted block the wheel can be turned from the line of draft so as to overcome the resistance, tending to cause it to mount the wall; or in shallow plowing, when the resistance is not so great, it can be turned so as to cause it to run against the wall and prevent swerving to the right. It is sometimes necessary to change the inclination of the spindle F, and this is accomplished by means of the stepped washer G. (Shown in Fig. 17.) This washer is angular in shape, and when the spindle F rests in its normal position, the small portion of the washer G is set into the oblong groove $g$ of the arm $f^2$ of the spindle. This washer then projects up to the top of the said arm $f^2$, and abuts against the lower inner face of the box E and holds the spindle solidly in position. When it becomes necessary to straighten the wheel slightly, the washer G is turned around until its lips $g^2$ rest on the side edges, $g^3$, of the arm $f^2$. If it is desired to straighten up the wheel still further, the washer is so placed that its straight side rests on the upper edge of the arm $f^2$. This washer is held in place by the same bolt that secures the rear end of the arm $f^2$ to the box E.

When transporting the plow from farm to farm, it is desirable that the furrow-wheel should run straight instead of inclined, as shown. This is accomplished by removing the bolt $g^4$ from the slots $f$ and tilting the arm $f^2$ until it rests in an inclined position and the spindle F in a horizontal position. This brings the slot $f'$ of the arm $f^2$ in a line with the opening $g^5$ when the bolt $g^4$ is passed through said opening and through the elongated opening $f'$ in the arm.

The central portion of the axle is spanned by the arched seat-support $E^2$, one end of which latter is rigidly bolted to the upwardly-projecting lug $e^7$ of the sleeve C, while the opposite end thereof is bolted to the arm $e^{10}$, which latter encircles the other spindle $a'$, and is held in place by the sleeve C'. This arch and arm $e^{10}$ are straightened by the brace $e^8$, which latter passes forwardly, and is secured to the tongue in front of the forward end of the beam B'. The sleeve C' is provided near its outer end with the laterally-projecting lug, $h$, to which the lower end of the lever H is secured. To the angular end of the spindle $a'$ is rigidly secured the sector H', to which the lever H can be locked by means of the dog $h^4$. The sleeve C' is provided with an axle-spindle, $H^2$, formed integral therewith, on which the landside-wheel is journaled. Thus it will be seen that by releasing the dog $h^4$ and moving the lever H forwardly, the crank A can be raised and lowered and turned and the plow-frame leveled. The landside-wheel is provided with the ring I, which latter is provided with a series of pockets, $i$. This ring is set concentric with the hub of the wheel, and the pockets $i$ come directly opposite and in line with the outer end of the spindle $a'$. This spindle is hollow, and is provided with the longitudinally-sliding spring-actuated dog I', the outer free end of which is adapted to enter one of the pockets $i$ and lock the axle A to the wheel and cause the former to turn with the wheel. This dog I' is encircled within the spindle $a'$ by two springs, $i^2$ $i^3$, which latter are separated by the pin $i^4$. The spring $i^3$, encircling the inner end of the dog I', is stronger than the spring $i^2$, and consequently is sufficient to overcome the latter. The dog I' projects clear through the spindle $a'$ and is connected at its inner end to one arm of the bell-crank lever $I^3$. (Shown in Fig. 28.) The opposite or long arm of this bell-crank lever passes toward the center of the axle A, and terminates within the cam-slot J, formed in the plate J', which latter is secured to the rear end of the locking-tongue K. The bell-crank lever $I^3$ is pivoted to the cranked axle A, and forces the dog I' outwardly into contact with the ring on the land-wheel. As before stated, the inner end of this lever $I^3$ rests within the cam-slot J of the plate J', which latter is secured to the locking-tongue K. This locking-tongue K (clearly shown in Fig. 28) is provided on its lower face with a groove, in which the spring K' rests, one end of the said spring bearing against a shoulder formed on the tongue, while the opposite end bears against the shoulder $h^5$, formed in the lower front section of the beam. (Shown in Fig. 26.) This section L is provided with a depending lug, $h^6$, to which the lower end of the foot-lever $a$ is pivoted, and is provided at its elbow with an opening, $h^7$, in which the inwardly-projecting finger, $h^8$, of the locking-tongue K rests. The section L of the beam is rigid, and hence when foot-pressure is applied to the lever $a$, the tongue K is drawn away from the axle. By drawing the tongue away from the axle the rear wall of the plate J', which is curved to closely embrace the axle, strikes the inner end of the bell-crank lever I³ and forces the dog I' into one of the pockets of the ring I on the land-wheel. This locks the axle and land-wheel together, and the draft of the team directly on the front end of the plow-beam turns the arched or cranked portion of the axle up, and hence as the axle turns and elevates the rear end of the plow-beam the plate J', which is situated on the beam near the axle, is also raised. As the bell-crank lever I³ is nearer the axis of the machine than the plate J', its movement is not so great as the said plate, and hence the lower wall of the slot J strikes the end of the lever I³, and as the upward movement of the axle is continued this lower wall is caused to assume an upwardly-inclined position, up which the free end of the bell-crank lever is caused to ascend. This movement of the bell-crank lever withdraws the bolt I', and consequently unlocks the axle and land-wheel. As the lever B⁴ is rigidly secured to the axle on the furrow side of the machine, it follows that as the axle turns this lever also moves forward, and the dog thereon engages the ratchet-teeth c of the double sector. Just as the dog I' leaves the pocketed ring of the land-wheel and leaves the plow free to drop, the dog on the lever B⁴ engages one of the ratchet-teeth c and holds the plow elevated. The latter can then be lowered at any time by releasing the dog on the lever B⁴ and allowing the said lever to fall back. The end of the lever I³, attached to the dog or plunger I', rests against one end of the spring $i^2$, and hence when the dog I' is in engagement with the ring on the land-wheel the spring allows the lever I³ to be be still farther moved in without binding or otherwise straining the parts. The other spring, $i^3$, simply withdraws the dog or plunger I' after the pressure of the bell-crank lever I³ has been relieved therefrom.

The section L of the beam is provided at its rear end with a semicircular bearing, L², which latter rests within the groove $i$, formed in the lower face of the lower section, M, of the rear end of the beam. The front end of this section of the beam is provided with an open slot, $i'$, while the rear end thereof is provided at one side with the angle-iron M'. This section is also provided with a semicircular bearing, in which the bearing $a^2$ of the axle A rests, and with an opening, $i^2$, for the passage of a bolt, which assists in securing the parts together. The upper section, N, of the rear end of the beam is provided with a semicircular bearing, M³, which registers with the bearing M² of the section M, and forms a complete bearing for the axle, and is also provided on one side with the angle-iron M⁴. When the two sections M and N are placed together around the axle and secured by passing a bolt through the holes $i^4$ and $i^2$, the angle-irons M' and M⁴ are separated sufficiently for the introduction of the upper end of the curved standard O, which latter is then rigidly secured to the said sections by bolts. The section N is open immediately behind the bearing M³, as shown at $i^5$, and the section M open behind the bearing M², and when the parts are secured together the openings come together and form a passage-way for the end $m$ of the beam proper.

The beam B' is provided with the semi-cylindrical bearing $n$, which latter rests within the groove $n'$, formed on the upper surface of the section N, and is provided immediately in front and behind said bearing with bolt-holes, by means of which it is rigidly secured to the section L. Thus it will be seen that the beam B' and section L are rigidly secured together and rest in front of the axle, and the sections M and N are rigidly secured together and rest behind the axle, the first two mentioned parts being secured by three bolts—two in front and one behind the axle, and the two latter parts by one bolt behind the axle. When they are secured to the axle, they form a joint or articulation, which enables the opposite ends of the plow-beam to move independently of each other. It is necessary, however, to provide means for holding the parts rigid while the machine is plowing, and this is accomplished in the following manner: The rear end of the section N is provided with two laterally-extending arms, $o$, which latter rest against the lower face of the beam B' and prevent the rear end of the plow-beam from falling below the plane of the front portion of the beam. These parts are assisted in this respect by the rear end of the section L, which latter rests against the lower face of the section M and assists in holding the rear end of the beam up. This arrangement does not, however, prevent the rear end of the beam from tipping up and riding over stones, as it would frequently do while turning up stony ground; and hence it is necessary to lock the rear end of the beam solidly to the front thereof. This is accomplished by the tongue K, which latter is held under the slotted plate $i^6$ by the spring K'. When the plow is moving forward, by simply pressing down on the front end of the lever $a$ the dog is withdrawn from under the plate $i^6$ and leaves the rear end of the beam free to tilt upward. This movement of the tongue and the plate J', attached thereto, moves the bell-crank lever I³, and the latter in turn locks the dog I' to the land-wheel. This causes the axle to turn with the land-wheel until it reaches a predetermined height, at which point the dog I' is released, as before described, and the dog on the lever B⁴ engages its sector and holds the plow elevated. After the tongue K is withdrawn it leaves the plow free to rise independently of the axle and ride over without any difficulty whatever any root or other obstruction it may encounter.

The tongue P is secured at its rear end to a seat formed integral with the sleeve C, and is provided with the laterally-projecting bracket P', the outer end of which is supported by the brace-rod $e^8$. To this bracket is loosely journaled the swinging sleeve $p^2$, provided with an arm, P³, which latter is provided with an oblong slot, p, through which a bolt secured to the plow passes. This allows the front end of the plow-beam to play up or down, as it does in rough ground, to prevent the tongue from pounding against the horse's necks. The arm P³ is preferably made in two parts and adjustably connected together by a bolt, p⁴, for the purpose of holding the plow-beam level and compensating for the difference in heights of the teams.

The plow R is provided on its rear face with a block, R', having a curved bearing-face, R², in which the standard rests. This standard is held against the face by the arm R³, one end of which is secured to the rear face of the mold-board, while the opposite end thereof is provided with a lip, r, which latter overlaps the side of the standard and prevents the latter from being displaced laterally in one direction, while the shoulder r² prevents it from moving in the opposite direction. The arm r³ is held in close contact with the rear end of the standard by the bolt R⁴. The lower end of the standard O is provided with an oblong transverse slot, through which the bolt S passes. In some soils—such as stubble ground—it is desirable to give the furrow as great a turn as possible, so as to completely cover the stubble, while in sod ground it is desirable to give the least possible turn that will lay the sod face downward, for the purpose of preventing the sod from breaking up into small pieces. This is accomplished by loosening the bolts S and R⁴ and turning the plow so as to throw the rear end of the mold-board either forward or back, as necessity demands.

If it is desired to turn stubble ground, the plow is turned so as to bring the rear end of the mold-board forward, while in turning sod ground the plow would be set in the opposite direction.

It is evident that numerous changes in the construction and relative arrangement of the several parts might be resorted to without departing from the spirit of my invention; and hence I would have it understood that I do not limit myself to the exact construction shown and described, but consider myself at liberty to make such changes and alterations as fairly fall within the spirit and scope of my invention.

Having fully described my invention, what I claim as new, and desire to secure by Letters Patent, is—

1. In a sulky-plow, the combination, with the supporting-wheels, of a crank having a jointed plow-beam journaled thereon, and devices for detachably locking the crank to one of the supporting-wheels for elevating the plow by the draft of the team, substantially as set forth.

2. In a sulky-plow, the combination, with the supporting-wheels and tongue, of a crank-axle, and a jointed plow-beam journaled at its jointed portion on the crank-axle, means for securing the forward section of the beam to any desired vertical adjustment, and devices for detachably locking the crank to one of the supporting-wheels, substantially as set forth.

3. In a sulky-plow, the combination, with the supporting-wheels, a crank-axle, one end of which is journaled in a sleeve, and a tongue secured to said sleeve, of a hinged plow-beam constructed to be locked to form a rigid beam, and devices for locking the crank-axle to one of the supporting-wheels for raising the plow, substantially as set forth.

4. In a sulky-plow, the combination, with a crank-axle, a plow-beam journaled on the crank-axle, and supporting-wheels, one of which is provided with an annular series of pockets or recesses, of a sliding dog supported in the hollow spindle of the crank-axle, and devices for moving the dog into and out of engagement with the pockets or recesses on the supporting-wheel, substantially as set forth.

5. The combination, with a cranked axle supported on wheels and a jointed plow-beam journaled on the axle, of devices for rigidly locking the two parts of the beam together, and devices for locking the axle to one of the wheels, substantially as set forth.

6. The combination, with a cranked axle, wheels supporting the axle, a jointed plow-beam journaled to the said axle, and devices for locking the axle to one of the wheels, of a device for locking the two parts of the jointed beam, and a lever for simultaneously unlocking the two parts of the beam and locking the axle to one of the ground-wheels.

7. The combination, with a cranked axle, a jointed plow-beam journaled on said axle, wheels supporting the axle, and devices for locking one of the wheels to the axle, of a sliding tongue for locking the two parts of the jointed beam, a spring-actuated dog indirectly connected to said tongue, and a lever for simultaneously moving the tongue and dog.

8. The combination, with a cranked axle having spindles formed on the opposite ends thereof, sleeves in which the said spindles rest, and wheel-spindles connected to the sleeves, of a sector secured to the axle-spindle on one side of the machine, and a hand-lever connected to the sleeve on the same side of the machine, and provided with a dog for engaging the sector, and a hand-lever connected to the axle-spindle on the opposite side of the machine, and provided with a dog for engaging a sector secured to the sleeve on the same side of the machine.

9. The combination, with a cranked axle supported in sleeves and wheel-spindles connected to the sleeves and forming cranks, of a jointed plow-beam, tongue for locking the two parts of the beam, a sliding dog for locking the axle to one of the wheels, and mechanism connecting the tongue and dog, whereby they are operated simultaneously, substantially as set forth.

10. The combination, with the cranked axle provided with the spring-actuated dog, the wheels, one of which is provided with a recessed plate, and a jointed plow-beam journaled to the axle, of a tongue for locking the two parts of the jointed beam, and provided with a plate having a cam-slot formed therein, a bell-crank lever, one end of which is connected to the dog, while the opposite end rests within the cam-slot, and a lever for operating the tongue and dog simultaneously.

11. The combination, with the cranked axle and spring-actuated sliding dog seated within the axle, wheels, one of which is provided with a recessed ring or plate, and a jointed plow-beam journaled on the axle, of a spring-actuated sliding tongue for locking the two parts of the beam, and intermediate devices connecting the dog and tongue, whereby both are operated simultaneously.

12. The combination, with a cranked axle and supporting-wheels, of a jointed plow-beam made up in sections and embracing the axle at the joint, the said sections being provided with lips or projections for holding the two portions of the beam in the same plane.

13. The combination, with a cranked axle and supporting-wheels, of a jointed plow-beam consisting, essentially, of two rear sections secured together and embracing the axle, and two front sections secured together and embracing the rear section, one or more of the said sections being provided with projections for holding the parts of the beam in the same plane, substantially as set forth.

14. The combination, with a cranked axle and supporting-wheels, of a jointed plow-beam consisting, essentially, of two rear sections secured together, each of which is provided with a semicircular bearing for embracing the axle, and a rearward extension and two front sections secured together and provided with bearings for embracing the bearings of the rear sections, one or more of the said sections being provided with lips for holding the two parts of the beam in the same plane, and a plow-standard secured between the rearward extensions of the rear sections, substantially as set forth.

15. The combination, with a crank-axle having spindles on opposite ends, a spring-actuated dog seated in one of the said spindles, devices for operating the dog, and a spindle-sleeve having a wheel-spindle formed integral therewith, of a sector secured to the axle-spindle, a hand-lever secured to the sleeve and provided with a spring-actuated dog, and a land-wheel provided with a recessed ring, with which the spring-actuated dog engages.

16. The combination, with an axle having spindles formed on opposite ends thereof, of a sleeve rigidly secured to the draft-tongue, a wheel-spindle pivotally secured to the sleeve, and a lever for moving the spindle horizontally.

17. The combination, with an axle having a spindle on one end thereof, of a sleeve, C, rigidly secured to the draft-tongue and provided with a sector, a lever, B⁴, loosely secured to the spindle, and provided with a dog for engaging the sector, and a plate, B⁵, rigidly secured to the spindle and connected to the lever B⁴.

18. The combination, with an axle having a spindle on one end thereof, of the sleeve C, rigidly secured to the draft-tongue and supporting said spindle, the levers B⁴ and B⁵, and the sector for engaging the dog on the lever B⁴, all of the above parts constructed as described.

19. The combination, with the axle having spindles on opposite ends, of the sleeve C, rigidly secured to the draft-tongue and supporting one end of the axle, the pivoted block secured to the under side of the sleeve, devices for turning the block, and a wheel-spindle secured to the block, substantially as set forth.

20. The combination, with the sleeve C, supporting one end of the axle, and provided with a two-part sector, one part of which is adjustable on the other, of a hand-lever rigidly secured the axle, and provided with a dog for engaging the two-part sector.

21. The combination, with the sleeve C, supporting one end of the axle, and provided with a two-part sector, one part of which is provided with ordinary pinion-teeth and adjustably secured to the other, which is provided with ratchet-teeth, of the hand-lever rigidly secured to the axle, and provided with a dog for engaging the sector, substantially as set forth.

22. The combination, with a sulky-frame having a tongue, a laterally-projecting bracket secured to the tongue, and a plow-beam sit-situated under the bracket, of a sleeve loosely journaled to the bracket, and provided with an extensible arm, the lower end of which is loosely secured to the front end of the beam, substantially as set forth.

23. The combination, with a plow-standard provided at its lower end with a transverse slot, of a plow provided on its rear face with a block, R′, the arm R³, bolt r², for clamping the standard between the arm and block, and a bolt for securing the lower end of the standard to the plow, substantially as set forth.

24. In a sulky-plow, the combination, with the supporting-wheels, of a crank-axle journaled at its opposite ends in sleeves connected with short axles, on which the supporting-wheels are mounted, a jointed plow-beam journaled on said crank-axle, said jointed beam being adapted to be locked together and form a rigid beam, and devices for detachably locking the crank-axle to one of the supporting-wheels, substantially as set forth.

In testimony whereof I have signed this specification in the presence of two subscribing witnesses.

WILLIAM L. CASADAY.

Witnesses:
S. G. NOTTINGHAM,
GEO. F. DOWNING.